Patented May 15, 1945

2,376,208

UNITED STATES PATENT OFFICE 2,376,208

COPOLYMERS OF VINYLIDENE CHLORIDE AND CONJUGATED DIENE HYDROCARBONS

Harold Tucker, Cuyahoga Falls, Ohio, assignor to The B. F. Goodrich Company, New York, N. Y., a corporation of New York No Drawing. Application January 16, 1941, Serial No. 374,696

8 Claims. (Cl. 260—92.5)

This invention relates to the copolymerization of vinylidene chloride and butadiene hydrocarbons such as butadiene, isoprene, dimethyl butadiene, piperylene and the like, and to the products thereby obtained.

In U. S. Patent 2,215,379 to Sebrell a rubber-like copolymer of butadiene and vinylidene chloride prepared by the copolymerization of a monomer mixture containing from 50 to 65% by weight of butadiene has been disclosed. This patent teaches, however, that no copolymerization occurs when the proportion of vinylidene chloride exceeds 50% by weight. The teaching of this patent is in accordance with the general belief of those skilled in the art that it is necessary to employ at least 50% by weight of butadiene or one of its hydrocarbon homologs in order to obtain a rubber-like vulcanizable copolymer of the butadiene copolymer type.

I have now discovered, quite contrary to expectations and to former beliefs and experience, that a rubber-like vulcanizable copolymer may be obtained by the copolymerization of a monomer mixture containing less than 50% by weight of butadiene or some other butadiene hydrocarbon and more than 50% by weight of vinylidene chloride.

Thus, by the practice of this invention, rubber-like materials which may be processed in substantially the same manner as natural rubber or synthetic rubber of the butadiene copolymer type, and which may be vulcanized with sulfur and other compounding ingredients to yield a useful vulcanizate, are prepared by the copolymerization of a monomer mixture containing over 50% by weight of vinylidene chloride and less than 50% by weight of butadiene. Preferably vinylidene chloride should be employed in proportions ranging from about 60 to 85% by weight of the monomer mixture, the remainder consisting of a butadiene hydrocarbon which is present, accordingly, in an amount ranging from 15 to 40% by weight. When less than 15% by weight of butadiene is employed the yields are low and the rubber-like properties of the products are not so pronounced.

Although any of the well known methods for effecting the copolymerization may be employed, it is preferred to polymerize the monomer mixture in form of an emulsion. In this process the mixture of vinylidene chloride and butadiene is emulsified with a non-solvent liquid, preferably water, with the aid of an emulsifying agent, a catalyst or accelerator for the polymerization is preferably added together perhaps with other substances which activate the catalyst or otherwise influence the polymerization in a desired manner, and the emulsion is then allowed to polymerize by continuously agitating the same at a temperature of about 20 to 60° C. for a time sufficient to bring about polymerization, usually from about 15 to 150 hours. The copolymer is obtained as a milky emulsion resembling rubber latex to which an age-resister or antioxidant may be added, if desired, and which may then be utilized as such or coagulated by the methods ordinarily used to coagulate rubber latices, for example, by addition of acid, alcohol or salts or by a combination of these methods. After coagulation the copolymers are separated from the emulsion, washed, dried and otherwise processed in the usual manner.

A large number of materials may be used in the above process to bring about emulsification of the monomer mixture with water. Partially neutralized fatty acid soaps such as 70–95% neutralized soaps of myristic, palmitic, oleic or stearic acids are preferred although other emulsifying agents such as completely neutral soaps and synthetic soap-like materials such as hymolal sulfates or sulfonates, aromatic sulfonates, and salts of high molecular weight aliphatic bases are also operative. The most desirable conditions for the polymerization require an emulsion which is only moderately alkaline, i. e. a pH from 7 to 10. The pH of the emulsion is most easily regulated by the emulsifying agent, hence it is desirable to employ those emulsifying agents which provide the most desirable pH conditions for the polymerization.

As catalysts or initiators of polymerization it is most desirable to employ a per-oxygen type compound such as hydrogen peroxide, diacyl peroxides, benzoyl peroxide, persulfates, percarbonates, perborates and the like. Another class of compounds which has been found to be equally effective are the diazo type compounds such as diazoamino benzene, dipotassium diazo methane disulfonate and the like. When hydrogen peroxide is used as the catalyst or initiator it is particularly efficacious to employ therewith a peroxide activator such as sodium pyrophosphate, sodium oxalate, urea, glycine, alanine and the like or a heavy metal salt such as iron or cobalt chloride associated with various complex forming inorganic compounds such as pyrophosphates or organic compounds such as organic acids or organic polyhydroxy compounds. In some instances it may also be desirable to add other ingredients to the polymerization mixture such as certain sulfur containing compounds in order to improve the properties of the copolymers or to modify the course of the polymerization.

As a specific example of one embodiment of this invention an emulsion containing the following ingredients is prepared:

| | Parts |
|---|---|
| Vinylidene chloride | 70 |
| Butadiene | 30 |
| Emulsifying solution (2% aqueous myristic acid, 90% neutralized) | 250 |
| Hydrogen peroxide (3½% aqueous solution) | 10 |
| Sodium ferro pyrophosphate | 3.0 |

The emulsion is placed in a glass-lined bomb and continuously agitated for 41 hours at a temperature of 40° C. The emulsion is then coagulated with dilute sulfuric acid whereupon an 85% yield of a tough, elastic material somewhat similar in appearance to crude rubber is obtained. This material is substantially insoluble in gasoline and swells only slightly in benzene. It mills well on the ordinary rubber mill, and may be compounded with softeners, fillers and vulcanizing ingredients in the same manner as other rubber-like materials.

The copolymers prepared by the method of this invention are considerably tougher, more oil and solvent resistant and less tacky than are copolymers similarly prepared from mixtures containing a preponderance of the conjugated diene. There is also considerable difference in the compounding and vulcanizing technique since the copolymers containing over 50% by weight of vinylidene chloride require larger proportions of plasticizing or softening agents, and require smaller amounts of sulfur to obtain a satisfactory cure. Satisfactory vulcanizates may be obtained from these copolymers when using less than 1% of sulfur. Larger amounts of sulfur produce a vulcanizate which more nearly resembles hard rubber vulcanizates or ebonite. The same accelerators of vulcanization employed for natural rubber or other synthetic rubbers may be employed in these vinylidene chloride butadiene copolymers.

It is to be understood that the example hereinabove set forth illustrates only a preferred embodiment of the invention and that numerous modifications therein may be employed. For example, the method of polymerization, the conditions and the precise ingredients of the emulsion being polymerized may be varied provided that the vinylidene chloride and the butadiene hydrocarbon are present in the proportions hereinabove set forth.

I claim:

1. The method which comprises polymerizing a monomeric mixture of vinylidene chloride and a butadiene-1,3 hydrocarbon, said mixture containing from 60 to 85% by weight of vinylidene chloride, in an aqueous emulsion having a pH of 7 to 10 and in the presence of a peroxide catalyst.

2. The method which comprises polymerizing a monomeric mixture of vinylidene chloride and butadiene, said mixture containing from 60 to 85% by weight of vinylidene chloride, in an aqueous emulsion having a pH of 7 to 10 and in the presence of hydrogen peroxide.

3. The method which comprises polymerizing a monomeric mixture containing about 70% by weight of vinylidene chloride and about 30% by weight of butadiene in an aqueous emulsion having a pH of 7 to 10 and in the presence of a peroxide catalyst and a heavy metal salt.

4. The method which comprises polymerizing a monomeric mixture containing 70% by weight of vinylidene chloride and 30% by weight of butadiene in an aqueous emulsion having a pH of 7 to 10 and containing a partially neutralized fatty acid soap as the emulsifying agent, and in the presence of hydrogen peroxide and an iron pyrophosphate.

5. A copolymer of vinylidene chloride and a butadiene hydrocarbon prepared by the method of claim 1.

6. A copolymer of vinylidene chloride and butadiene prepared by the method of claim 2.

7. A copolymer of vinylidene chloride and butadiene prepared by the method of claim 3.

8. A copolymer of vinylidene chloride and butadiene prepared by the method of claim 4.

HAROLD TUCKER.